(12) United States Patent
Zuccardi et al.

(10) Patent No.: US 11,359,160 B2
(45) Date of Patent: Jun. 14, 2022

(54) METHODS AND DEVICES TO EXTRACT OIL FROM OILY FRUITS

(71) Applicant: ALFA LAVAL COPENHAGEN A/S, Søborg (DK)

(72) Inventors: Jose Miguel Zuccardi, Mendoza (AR); Francisco Alberto Bonino, Mendoza (AR)

(73) Assignee: ALFA LAVAL COPENHAGEN A/S, Søborg (DK)

( * ) Notice: Subject to any disclaimer, the term of this patent is extended or adjusted under 35 U.S.C. 154(b) by 0 days.

(21) Appl. No.: 16/649,380

(22) PCT Filed: Sep. 21, 2018

(86) PCT No.: PCT/EP2018/075674
§ 371 (c)(1),
(2) Date: Mar. 20, 2020

(87) PCT Pub. No.: WO2019/057927
PCT Pub. Date: Mar. 28, 2019

(65) Prior Publication Data
US 2021/0169097 A1 Jun. 10, 2021

(30) Foreign Application Priority Data
Sep. 22, 2017 (WO) ................. PCT/EP2017/074131

(51) Int. Cl.
*C11B 3/16* (2006.01)
*C11B 1/12* (2006.01)
(Continued)

(52) U.S. Cl.
CPC ................. *C11B 3/16* (2013.01); *A23D 9/04* (2013.01); *B01D 5/0045* (2013.01); *B01D 21/262* (2013.01); *C11B 1/10* (2013.01); *C11B 1/12* (2013.01); *B01D 17/042* (2013.01); *B01D 17/044* (2013.01)

(58) Field of Classification Search
CPC ... C11B 1/10; C11B 1/12; C11B 3/006; C11B 3/16; B01D 17/042; B01D 17/044; B01D 1/00; B01D 1/06; B01D 5/0045; B01B 1/00; B01B 1/005
See application file for complete search history.

(56) References Cited

U.S. PATENT DOCUMENTS

2010/0191007 A1* 7/2010 Davis ..................... C11B 3/006
554/22

FOREIGN PATENT DOCUMENTS

| CL | 2018000321 A1 | 6/2018 |
| WO | 03099975 A1 | 12/2003 |
| WO | 2017/024072 A1 | 2/2017 |

OTHER PUBLICATIONS

Clodoveo, M. L., et al., What's now, what's new and what's next in virgin olive oil elaboration systems? A perspective on current knowledge and future trends, Journal of Agricultural Engineering, vol. 45, issue 2, pp. 49-59 and copyright page (Year: 2014).*
(Continued)

*Primary Examiner* — Yate' K Cutliff
(74) *Attorney, Agent, or Firm* — Buchanan Ingersoll & Rooney PC

(57) ABSTRACT

A method, device and a system for extracting oil from a paste of oily fruit by exposing the oily fruit paste to vacuum.

19 Claims, 6 Drawing Sheets

(51) Int. Cl.
  *A23D 9/04* (2006.01)
  *B01D 21/26* (2006.01)
  *C11B 1/10* (2006.01)
  *B01D 5/00* (2006.01)
  *B01D 17/04* (2006.01)

(56) References Cited

OTHER PUBLICATIONS

Veneziani, G., et al., Improvement of olive oil mechanical extraction: New technologies, process efficiency, and extra virgin olive oil quality, Production from Olive oil tree, Chapter 2, edited by Dimitros Boskou and Marie L. Clodoveo, IntechOpen, 22 pages (Year: 2016).*

Anon, "Milling to Maximize Polyphenols mThe essence of extraction: milling under vacuum", The Olive Press, 2011, pp. 1-2, XP002785900, Retrieved from the Internet: URL:https://apollooliveoil.com/press.php, retrieved on Oct. 19, 2018.

Cassiday, "Red palm oil", The American Oil Chemists' Society, 2009 (month unknown), 9 pages.

Clodoveo, "An overview of emerging techniques in virgin olive oil extraction process: Strategies in the development of innovative plants", Journal of Agricultural Engineering, vol. XLIV, 2013 (month unknown), pp. 297-305.

Dergal, Química de los alimentos, Cuarta edición, Pearson Educación, 2006 (month unknown), 718 pages.

Fadda, et al., "Changes during storage of quality parameters and antioxidant activity of extra virgin monovarietal oils obtained with two extraction technologies", Food Chemistry, Mar. 2012, vol. 134, No. 3, pp. 1542-1548, XP028484452.

International Preliminary Report on Patentability (PCT/IPEA/409) dated Dec. 6, 2019, by the European Patent Office as the International Preliminary Examining Authority for International Application No. PCT/EP2018/075674.

International Search Report (PCT/ISA/210) and Written Opinion (PCT/ISA/237) dated Oct. 31, 2018, by the European Patent Office as the International Searching Authority for International Application No. PCT/EP2018/075674.

Migliorini, et al., "Influence of operating conditions of oil emulsion breaking on the quality of extra virgin olive oil", Rivista Italiana Delle Sostanze Grasse, 2009 (month unknown), vol. 86, pp. 92-102, XP9508831.

Servili, et al., "Influence of the Decrease in Oxygen during Malaxation of Olive Paste on the Composition of Volatiles and Phenolic Compounds in Virgin Olive Oil", J. Agric. Food Chem., 2008 (month unknown), vol. 56, No. 21, pp. 10048-10055.

Vugts, "Palm Oil Process The Principle & Operational Techniques", https://vdocuments.site/palm-oil-process-the-principle-operational-techniques.html, retrieved Sep. 18, 2018.

Written Opinion (PCT/IPEA/408) dated Aug. 20, 2019, by the European Patent Office as the International Preliminary Examining Authority for International Application No. PCT/EP2018/075674.

Di Giovacchino, "Olive Oil Extraction by Pressing, Centrifugation and Percolation: Effect of Extraction Methods on Oil Yields", Science and Techniques, Apr. 1991, No. 36, pp. 14-30.

Khlif, et al., "Continuous-flow olive oil extraction in Tunisia: operating procedures", Science and Technology, Apr. 2003, No. 96, pp. 38-42.

Fennema, "Food Chemistry", Food Science and Technology, A Series of Monographs and Textbooks, Department of Food Science, Second Edition, 1985 (month unknown), pp. 371-476.

Belitz, et al., "Food Chemistry", Translation from the Fourth German Edition, 1987 (month unknown), pp. 92-151.

Office Action dated Aug. 23, 2021, by the Chile Patent Office in corresponding Chile Patent Application No. 202000741. (17 pages).

* cited by examiner

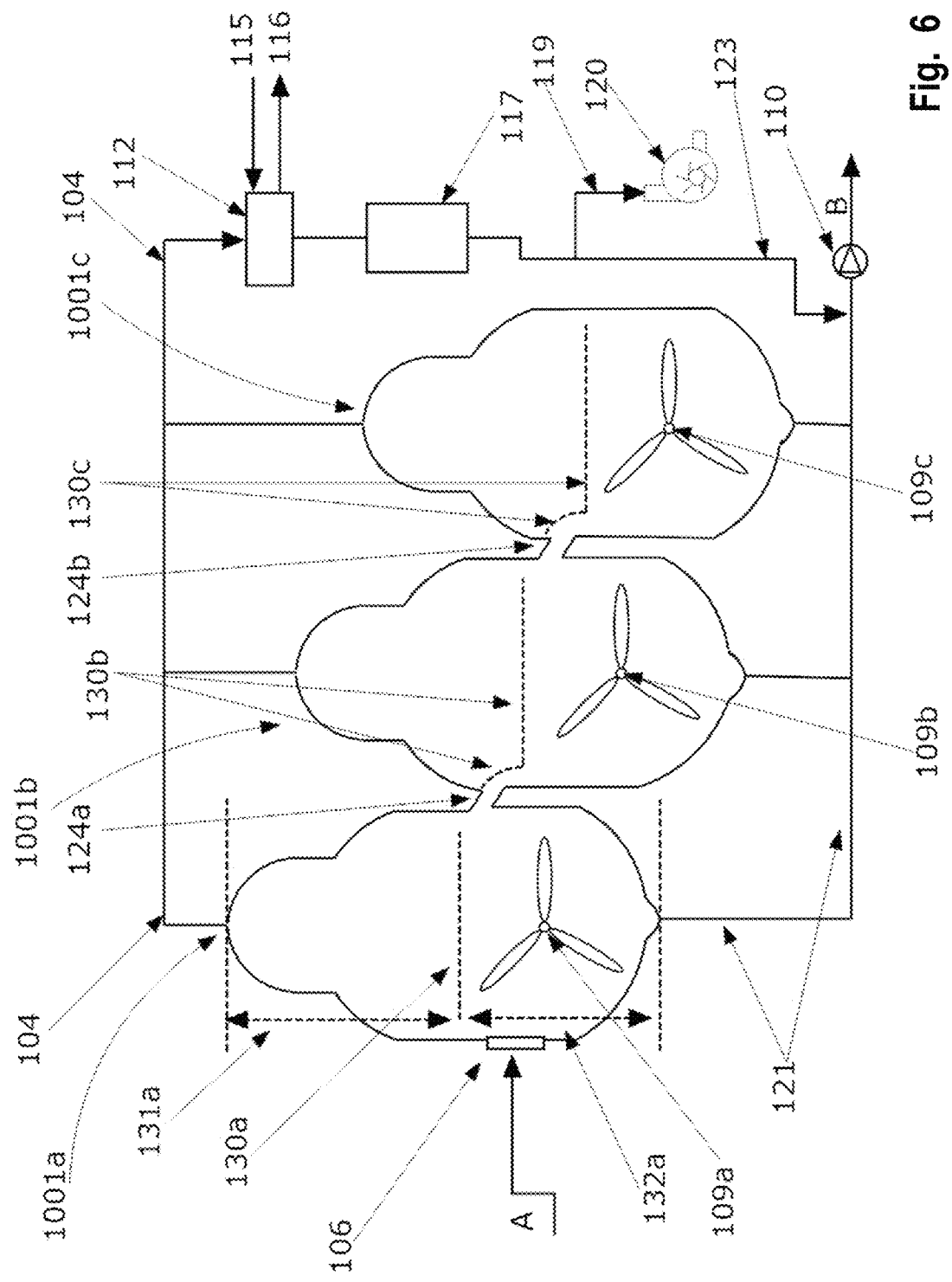

METHODS AND DEVICES TO EXTRACT OIL FROM OILY FRUITS

AREA OF INVENTION

This invention refers to a process to extract oil from an oily fruit by applying vacuum to the paste preparation thereby replacing the traditional step of malaxing. To this purpose a vacuum extractor is disclosed.

BACKGROUND OF INVENTION

The process of producing oil from oily fruits utilising physical means is widely known throughout the history of mankind, and current techniques are based on principles similar to those used for centuries, regardless of the tools that have been mechanized and improved to cut labour costs and time.

One of the main changes in production process of either olive oil or the production process of any other oil from an oily fruit was caused by the introduction of utilizing centrifugal force to separate oils from the pulp after malaxing. The utilization of centrifuge for the separation step, makes it possible to utilize continuous systems for the oil production.

Briefly, in the prior art, the process consists in the steps of debranching, leaf removal and washing the raw material, i.e., the freshly harvested oily fruit. In the following the process for olive oil production is described in more details. In order to obtain the oil, a series of steps are applied, which may consist in, among others: crushing/depitting, malaxing, pressing/centrifuging, and vertical decanting/centrifuging. In the following this process is described in more detail in the case of the oily fruit being olives.

Preparing the Raw Material
Reception

In the prior art, the raw material must arrive in the extraction plant in good sanitary condition and packed in proper containers.

Cleaning

In general, all prior art systems for olive oil production are designed to ensure that the olives reach the mill free of dirt, so as to prevent machine wear and tear. The cleaning can be done dry or may be supplemented by washing the olives with water, the latter being the more widely used method. The operations frequently conducted are the following:

1—Debranching: Useful especially when there are shoots and branches together with the olive. Continuous mechanical harvesting systems have this operation integrated, so in this case it is not incorporated in the oil production plant. The operation is conducted using rollers over which the branches are transported. The olives fall through the gap existing between these rollers.

2—Leaf removal: It is done by aspiration or ventilation.

3—Washing: The washing generally consists of 2 steps. In the first step, the olive is washed with constantly recirculating water. In the second step, the washed olive undergoes a final water spray rinse which completes the wash and allows for constant water renewal in the washer.

Preparing the Paste

The purpose of the crushing operation is to break up the tissues where the oily matter is embedded, and it must be done as smoothly as possible. During milling, some oil droplets are released.

This operation can be done by using several types of mills. The main types are stone mills or metallic crushers. The stone mills are usually either truncated conical or cylindrical shape. The most commonly used metallic crushers are hammers crushers. Usually, they have fixed or mobile hammers, 5 to 7 mm sieves, and rotate at between 1800 and 2400 rpm. Other kind of crushers are discs crushers where olives are crushed completely in a toothed disc crusher using a system that features a rotating disc acting against a stationary one. Olives fed into such a crusher are flung away from the centre, and crushed as they meet a toothed disc, powered by an electric motor.

Depitting machines operate by a screw feed assembly that leads the olives into a special container fitted with bores. A rotating mixer moves the olives towards the periphery where the pulp is separated from the stone, which is ejected, unbroken and clean, at the end opposite to the feeding side. The pulp passes through the basket holes and drops into the hopper underneath. A screw then moves the product from the hopper to a pump that feeds the malaxing machine.

Mills have the drawbacks of incorporating a great amount of air while rotating at such high speed and producing an oil-in-water emulsion, besides leaving mesocarp cellular tissue pieces of great size.

Grinding the olives only causes that between 40-50% of the oil drops dispersed in the paste have a diameter higher than 30 µm. To achieve continuous phase separation, the diameter of the drops should be greater than 30 µm (Khlif M., Rekik H., Arous N. (2003). La cadena continua en la extracción de aceite de oliva en Túnez: modalidades operativa. *Olivae*. 96:38-42). This correlates to the disclosure of Di Giovacchino, L. "Olive Oil Extraction by Pressing, Centrifugation and Percolation: Effect of Extraction Methods on Oil Yields", Olivae, vol. 36, p 14-30 (1991), that the smaller the oil drops' size, the higher their stability, making it more difficult for them to regroup into bigger drops The purpose of the malaxing is to coalesce the dispersed and emulsified liquid oil droplets in the ground paste in related continuous phases, in order to facilitate and increase the solid-liquid separation in the following production operations. It also produces the laceration of the external cells in the whole tissue pieces left in the mill, releasing a percentage of the oil in the interior of cellular vacuoles. Normally, this is done at temperatures ranging from 25 to 30° C., favouring cellular breakage by enzymatic action.

The walls and blades in the malaxer are usually made of stainless steel, and the malaxing should last long enough to obtain the highest percentage possible of free oil. Optimal malaxing conditions comprise a speed between 8 and 14 rpm at a temperature of 25 to 30° C. in the final paste, during 45 minutes to 3 hours.

The recently crushed/depitted olive paste does not have the optimal temperature to maximize coalescence of the released oil drops, wasting 50% of the time devoted to malaxing for the olive paste to reach the ideal temperature for the proper quality. This could cause malaxing time to be up to 2 hours, when the recommended time is 1 hour and even less than 50 minutes for 'Premium' quality Extra Virgin Olive Oils (EVOO). These malaxing times, combined with optimal temperatures and great air volumes incorporated into the paste in the mills produce the action of the peroxidase and polyphenoloxidase enzymes, therefore causing the paste oxidation and the reduction of the phenolic fraction of the oil.

It is worth clarifying that the finer particles will still be present in the oil after this step and would be eliminated in later steps in the process, such as gravity precipitation or filtering.

Separating Solid and Liquid Phases

Pressing, using hydraulic press has traditionally been the most widely used method to separate liquid and solid phases. During pressing, the prepared paste is placed on thin layers on the mats, which are placed on top of each other and then subject to pressure. Nowadays this method has mostly fallen into disuse.

Centrifugation has mostly replaced pressing. At present, centrifugation causes the mixed olive paste phases to separate into solid and liquid phase. This separation is done in a decanter (as horizontal centrifuges are called) having a rotor which spins at approximately 3,000 rpm.

Three-Phase or -Outlet System

This is the name given to the centrifuge system equipped with a decanter having three independent product outlets, separated during centrifugation and basically consisting of oil, waste water and olive cake.

This system uses added lukewarm water to the paste before it goes into the decanter, so as to fluidize it and achieve a better separation of the liquid phases, oil, and waste water or vegetation water.

Two-Phase or -Outlet System

This is the name given to the system having a decanter with two independent product outlet, oil and pomace (olive cake plus vegetation water).

Unlike the three-phase system, this system does not use added water and it does not produce vegetation water This system significantly reduces the effluent and the contaminant load in the oil production plants. Instead, a wet pomace is obtained, a solid by-product with a higher humidity degree.

The vibrating filter is a step used to retain the coarse particles that come with the oil at the decanter outlet. It has flat horizontal vibrating, slightly slanted, sifting sieves where the oil passing through the sieve is collected.

A third method for separation of solid and liquid phase is the Sinolea method. In this process, rows of metal discs or plates are dipped into the paste; the oil preferentially wets and sticks to the metal and is removed with scrapers in a continuous process. It is based on the different surface tension of the vegetation water and the oil, these different physical behaviors allow the olive oil to adhere to a steel plaque while the other two phases remain behind.

Sinolea works by continuously introducing several hundreds of steel plaques into the paste thus extracting the olive oil. This process is not completely efficient leaving a large quantity of oil still in the paste, so the remaining paste has to be processed by the standard modern method (such as industrial decanter).

Separating Liquid Phases

The liquid phase separation can be done using different methods, among which are gravity separation and centrifugation.

Gravity separation is an ancient separation method for oil and vegetation water, which is based on the different density between them. It is done by passing through several interconnected vessels with continuous feed.

Centrifugation is also based on the separation of the different phases (water and tissue remain left by the decanter) by their different densities, increasing gravity at a speed of 6500 rpm. This process emulsifies air into the oil, affecting its preservation by oxidation.

The centrifugation process leaves suspended water and vegetable tissue traces that precipitate slowly by the action of gravity. To favour this action, the centrifugation product is left in storage at higher temperature and regular sediment purges are performed. The water and tissues contain dissolved sugars, which are the ideal substrate for fermentations that transfer undesirable flavours to the oils. To prevent this, products are used to increase precipitation, but no significant results have been obtained. The oils get to storage with some humidity and impurities; these precipitate, ferment, and imbue the oils with undesirable scents and flavours. Therefore, the tanks where the oils are stored must have a conical bottom to allow for a proper purge.

Storage

The storage tank is the place where the filtered or unfiltered oil remains until its fractioning or transport, in general in stainless steel tanks. The storage tank must have isolating walls and ceilings against outer temperatures and should not transfer foreign flavours to the oils. It must also have a conditioning system to maintain a constant temperature of about 15-18° C., it should not produce odours and have low luminosity.

Olive Oil Quality

All food must comply with certain organoleptic features to be apt for consumption. Particularly, olive oil is classified by its quality into olive oil, virgin olive oil and extra virgin olive oil. The two main features that determine the quality of the oil are the acidity value and the peroxide value. These properties are directly affected by the olive oil extraction and conservation method. Mention should also be made to the quality of the raw material, the phytosanitary condition, the harvest system (that there are no broken or bruised olives) and the time between harvesting and extraction (if time is long, the final product will deteriorate).

A frequent practice at some facilities is to process the olives while they have been freeze injured. That is a mechanical rupture of the oily fruit tissue is created by freezing, therefore producing cellular burst by freezing and subsequent dehydration. As a result, yield is increased, but the olive oil quality is substantially reduced.

Rancidity of fats and oils is a natural process by which their composition is altered with time, which causes, among other things, a change in their organoleptic properties, i.e., a change in flavour. Specifically, the flavour of the oils which have undergone an intense oxidative process is called rancid.

In the hydrolytic rancidity, the lipases present in the olive pits catalyze glyceride hydrolysis, producing free fatty acids and partial glycerides. As a consequence, the acidity in the olive oil is increased. During the obtention of said oil, the hydrolytic reaction is produced in the oil-water interfase and increases exponentially during the emulsification of the olive paste as disclosed in Richardson T., Hylsop D. (2001). Chapter 6 In "Quimica de Alimentos" Fennema O. Ed Acribia; Belitz H. D., Grosch W. (1997). Chapter 2 In "Quimica de Alimentos" 2° Ed Acribia, Zaragoza and in Quirasco B. M., Lopez-Mungia A. C. (2006). Chapter 5 In "Quimica de Alimentos" Badui D. S., 4° Ed Pearson Education.

The acidity is expressed in grams of oleic acid per 100 g of olive oil and it is called acidity percent. The free fatty acids are essentially assessed using this percent, and it can be related not only to the features of the raw material used but also to the processing method. So, for example, the quality of the olive oil is directly related to the hydrolysis degree of the component triglycerides. As this degree increases, the amount of free fatty acids increases, thus increasing their acidity, with a proportional detriment in olive oil quality.

The oxidative rancidity is due to the oxidation of double bonds in the unsaturated fatty acids with peroxide or hydroperoxide formation, which later polymerize and break down, resulting in the formation of aldehydes, ketones and lower molecular weight acids. This process is accelerated in the presence of oxygen, light, heat, humidity, other free fatty acids, and certain inorganic catalysts such as iron and copper salts.

Fats that have undergone oxidation have an unpleasant flavour and scent and may be slightly toxic for some individuals.

Oxidative rancidity also destroys fat-soluble and water-soluble natural antioxidants. These are the main components of olive oil that provide health benefits. Among them are the following: tocopherols, carotenoids, phenolic fraction, among others.

The most important phenolic fraction in the olive is represented by:

Phenyl alcohols: 3,4-dihydroxyphenyl-ethanol, hydroxytyrosol, P-hyroxyphenyl ethanol and Tyrosol
Flavonoids: anthocyanins, rutin and leteoline-7-glucoside.
Secoiridoids: oleuropein, dimethyloleouropein, ligustroside and vervascoside.
Phenolic acids: elenoic acid.

The main role of antioxidants is to prevent, delay, and/or revert reactions leading to the oxidation of biological substrates (proteins, lipids, and nucleic acids).

An important parameter to determine the quality of olive oil is through UV spectroscopy. Absorbance measurements are taken at different wave lengths. This analysis provides indications about the quality of a specific oil and its preservation status. It is also used to detect the abnormal components in virgin olive oil and, as well as the peroxide value, the primary oxidation stages in the oil.

During the process of withdrawing and processing oil from an oily fruit, the oil will be exposed to oxygen, resulting in oxidation. Oxidation of the oil results in loss of volatile aromas and loss of beneficial micro-nutrients such as polyphenols (anti-oxidants). Furthermore, oxidation will result in unfavourable change in flavour and thereby the quality and flavour characteristic of the oil. Due to the negative effect exposure to oxygen and resulting oxidation has on the oil, it is known in the art to operate the malaxing or milling process under limited or mild vacuum to limit the exposure to oxygen.

Migliorini M. et al. (2008). "Influence of operating conditions of malaxation on the quality of extra virgin olive oil", J. Agric. Food Chem, v. 56, p. 10048-10055 discloses how olive oil quality is negatively affected by exposure to oxygen due to oxidation and accordingly how the quality can be improved by limiting the oxygen exposure of the extra virgin olive oil. In C. Fadda, A. Del Caro, A. M. Sanguinetti, P. P. Urgeghe, V. Vacca, P. P. Arca, 1, A. Piga "Changes during storage of quality parameters and in vitro antioxidant activity of extra virgin monovarietal oils obtained with two extraction technologies", Food Chemistry, vol. 134, p. 1542-1548 (2012) it is disclosed how utilization of mild vacuum (0.2 atm absolute. or 152 mm Hg absolute.) during storage of olive oil will improve or preserve the quality of the olive oil. Olive oil producers have reported the same effect positive effects of applying vacuum during malaxing (http://apollooliveoil.com/press.php) though the exact amount or level of vacuum is undisclosed. However, in this prior art, both the vacuum level or amount of vacuum utilized, and the purpose of the vacuum is different from the vacuum utilized in the present invention. All prior art has been focusing on how to limit either the processed oil or the paste during processing, from exposure to oxygen due to oxidation, and how mild/not that effective vacuum can be used to achieve that goal. However, in the present invention much stronger or deeper vacuum is applied with the purpose of withdrawing water or vapor from the pulp of the oily fruit, surprisingly resulting in the much increased release of oil from the pulp.

In Clodoveo, Maria Lisa, "An overview of emerging techniques in virgin olive oil extraction process"; Journal of Agricultural Engineering, vol. XLIV, p 297-305 (2013)) the use of pulsed electric field, power ultrasound or microwave radiation for furthering the oil release during olive oil production among other emerging techniques is disclosed. However, none of the new, emerging technologies disclosed does have the same beneficial effect of vastly improved oil release and improved oil quality without raising the temperature.

Use of vacuum cookers with optional aroma or flavour recovery units for water removal and improved aroma recovery within the food industry in general is also known. By utilizing vacuum cookers, the temperature during food processing can be lowered, resulting in milder conditions and increased quality of the processed food. However, use of such equipment for enhanced oil recovery has not been disclosed earlier.

Another oily fruit utilized for oil production is the palm fruit. The production process of palm oil is different from the process utilized for olive oil, utilizing much higher temperature and harsher methods. During the production process of palm oil, the oil is extracted from the palm fruit in so-called palm oil mills. In the front end of the process the fruit bunches are "sterilized" at elevated pressure by steam injection at around 145° C., for 90-120 min, where the palm bunches are both cooked or softened and sterilized. After the sterilization step the palm fruit can be easily separated from palm bunches as the fruit has been softened. Furthermore, owing to the increased humidity of palm fruit after the high temperature steam injection, the crude palm oil can be more easily extracted from the palm fruit in subsequent operations. The pulp or oily meat is then processed in a "digester" (typically steam jacketed, stirred vessels operating 15-20 min at 90-95° C., see the disclosure of Vugts, J. A., "Palm Oil Process The Principle & Operational Techniques", https://vdocuments.site/palm-oil-process-the-principle-operational-techniques.html (retrieved 18 Sep. 2018). Because of the sterilizing and cooking and the mechanical action of threshing and mashing, the palm pulp (or oily fruit meat) becomes soft and changes in the cell structure of the tissue occur, resulting in an easier extraction of oil from the pulp. Finally, the oil is separated from the pulp, traditionally by utilizing a screw press to produce a crude oil and an oily, solid waste.

As explained above, it is known from prior art that treating a palm fruit with high temperature will soften and damage the fruit meat structure resulting in an easier release of the palm oil. That kind of treatment has been unthinkable for the much more heat sensitive and expensive olive oil, Temperature control during olive oil production is highly important, as temperature above 30° C. adversely affects the quality of the oil, as the natural flavours and nutrients in olive oil are very temperature sensitive. However, in principle there could be considerable potential in extracting crude palm oil at mild conditions for maximum preservation of nutrients and antioxidants, to produce a high quality of what is known as "red palm oil" (https://www.aocs.org/stay-informed/read-inform/featured-articles/red-palm-oil-february-2017). Red palm oil is a kind of "virgin palm oil", with maximum preservation of nutrients, one of those being the red coloured carotenes a pre-cursor to vitamin A, that gives it its name. Such virgin oil will only require a mild posttreatment to adjust it organoleptic properties for the oil to acceptable to most consumers.

An industry similar to the one described is the avocado oil production industry. Briefly, it consists of three stages:

Washing and crushing/depitting: After harvesting, the avocados are washed. Then the avocado pulp is crushed, with or without the pit, to obtain a paste.

Malaxing: During the malaxing, the paste is gentle mixed and heated at 45-55° C. for a time from 45 to 120 minutes, then the oil is released from the oil cells where it is encapsulated. Consequently, this stage is decisive for the avocado oil yield and quality.

Separation: After malaxing, the paste is pumped into the decanter (2 or 3-phase) for its subsequent separation. As a result, the paste is separated into oil, water (vegetation water plus added water) and solids (3 phases). Besides, dilution water is added to fluidize it. On the other hand, in the two-phase process, the paste is separated into a light phase (oil) and a solid phase (pomace). The two-phase process requires little or no addition of dilution water depending on the humidity content of the raw material.

So far, no methods have been developed that allow obtaining high yields of high quality olive oil at a low temperature in a short time. To obtain olive oil in high yields using the current methods, the malaxing step must be extended to considerably over 1 hour if the temperature is kept low. Other solution for increase in oil yield is to raise the temperature to above 30° C. And for a significantly increased yield both the malaxing time and the temperature have to be changed. Both of those factors significantly deteriorate the quality of the oil.

Additionally, for good oil yields, the current methods need to start from olives with adequate ripeness for the tissues to soften, and preferably also with low humidity.

The current invention, discloses the use of vacuum at low temperature or softening and damaging the oily fruit pulp, hence enhancing the release of oil. It has surprisingly been discovered that the use of vacuum at a low temperature, will not only inhibit the adverse effect of oxygen on the oil quality, but will substantially improve the oil yield over conventional methods, without negatively affecting the quality of the oil. What is more, the method disclosed in the current invention not only considerably increases the oil yield, it also improves the quality of the oil obtained.

The process disclosed in the current invention also allows for processing olives or other oily fruits, of different ripeness and softness and of different humidity degrees, without affecting the oil yield obtained. Furthermore, the current invention also eliminates the addition of extraction aids during the extraction process and prevents antioxidant destruction, reducing oxidative rancidity by eliminating the presence of oxygen during most of the process.

The process disclosed in the current invention also allows for processing olive husk (pomace) coming from first olive oil extraction into a second extraction to get extra oil (re-milling).

DISCLOSURE OF INVENTION

Summary of Invention

This invention is based on differential treatments of the olive paste in the stages previous to entering the decanter (2 or 3 phases). The oily fruit is pre-treated traditionally, that is, the freshly harvested oily fruit is debranched, defoliated, and washed. Then, the oily fruit is grounded, e.g., using a crusher or depitting, to obtain a mixture of crushed oily fruit, oil-in-water emulsions, and a significant amount of air. After the pre-treatment the disaggregated tissue or pulp of the oily fruit enters a vacuum extractor that replaces the traditional malaxing step. In the vacuum extractor the pulp is subjected to vacuum, causing water release by evaporation or boiling of the water in the pulp, at the same time also stripping the pulp from dissolved air (oxygen). The water is released as water vapor with more or less entrained water droplets, depending on temperature and the strength or amount of vacuum utilized. During the vacuum treatment, the extraction of water from the oily fruit tissue, softens the tissue and causes changes in the cellular structure of the pulp, thereby enhancing the release of oil from the oily pulp.

Detailed Disclosure of Invention

As explained above, the freshly harvested raw material of oily fruit is prepared, by methods such as debranching, defoliating and washing. Then, the oily fruit is grounded, e.g., using traditional methods, to obtain a pulp or a paste, that is a mixture of crushed disaggregated cellular tissue of oily fruit, oil-in-water emulsions, and a great amount of air. In one embodiment of olive oil production of the current invention, the paste obtained is processed with, e.g., a rotary blade sifts with cylindrical sieves with perforations. The blades push the paste through the sieve orifices separating the pulp tissues. Additionally, in the sift the crushed pit is separated, which, because of its greater size, is pushed by the blades through the center of the cylinder towards the end opposite to the paste input. Then, by a mixing process they will be united again to prevent losing the pulp adhered to the crushed pit. It could also be possible to use sifts with higher separation efficiency, which do not require a mixing stage and increase the production capacity by processing only paste and discarding the clean pit pieces. In this embodiment of the invention, the sifted and/or unified paste then enters the vacuum extractor of this invention. In the current invention, the vacuum extractor replaces the traditional malaxing step. The vacuum extractor applies vacuum to extract water by evaporation or boiling from the pulp. The water, mainly extracted from the cellular tissue or intracellular juices of the oily fruit in questions, is extracted from the pulp, as water evaporates carrying more or less amounts entrained water droplets, depending on both the temperature and the strength or amount of vacuum applied in the extractor. Furthermore, air dissolved in the pulp will be stripped from the pulp. One can speculate that this exceptional increased oil release is due to the softening and dissolvement of the tissue of the oily fruit as water is extracted from within the cells of the oily fruit tissue. Another possible contributing factor to the surprisingly superior oil yield could be the changed physical properties of mixture of water vapor and paste.

Furthermore, the vacuum extractor has the advantage of working in the absence of atmospheric and dissolved oxygen, which prevents oxidation and considerably increases the oil shelf-life. This stage concludes the olive oil release from the paste, which will then be separated in later stages, utilizing traditional methods.

Using centrifugal force, the solid phase is separated from the liquid phase in a decanter or by any other suitable separation means. In this embodiment of the present invention, a two-phase or three-phase decanter may be used. Optionally, the phases could also be separated by using a press or any other suitable method. In this embodiment, the impure oil is subject to the effects of a vibrating filter to eliminate coarse impurities.

As the current invention will be further described with reference to the drawings below. As shown in the examples of this invention, the method described herein allows to obtain great amounts of high quality olive oil.

During the discussion and disclosure of the present invention, following definitions apply:

Shoots: one-year-old twigs.

Oil mill: the facility or place where the oil is obtained from the olive.

Waste water: vegetation liquid and water released from the olive paste.

Olive cake: the solid part of the olives, i.e., a mixture of pit, skin, pulp and oil residues from which most of the oil was extracted.

Pomace: a by-product obtained by the continuous two-phase extraction system. It is a mixture of water and olive cake, which can also be used after a drying process, as fuel or even as compost.

Sieve: wire mesh with multiple perforations. In this invention, it may be made of stainless steel with round perforations of different diameters (1; 1.5 and 2 mm) with a cylindrical shape. Its function according to this invention is to produce cellular breakage.

Veraison status: the degree of ripeness of an olive consistent with the colour change of the epicarp.

Vegetation water: have the appearance of a brown watery residue liquid. The liquid has a pleasant odour but a bitter taste. This effluent, which has relatively high organic matter content, constitutes a source of pollution for the olive industry Pulp; paste or disaggregated cellular tissue: The grounded or mashed oily meat, containing mixture of crushed oily fruit, oil-in-water emulsions, and a great amount of air.

Holding; malaxing time: Time that the oily fruit paste is exposed to vacuum within the vacuum extractor (time retained within the vacuum extractor).

Oily fruit: Any kind of fruit that comprises oil that can be released from the fruit by processing. Examples of an oily fruit are olive, palm fruit and avocado.

Vacuum: As referred to within this publication, vacuum refers to applied pressure that is lower than lower than the surrounding atmospheric pressure.

Saturated water pressure: As referred to within this publication, saturated water pressure is the pure liquid water vapor pressure at a given temperature. When the system pressure is equal to the saturated water pressure at that given temperature the boiling point is reached and the liquid water changes (boils) into a vapour.

Simmering: As referred to within this publication, simmering is the system pressure above saturated water pressure at a given temperature, generating considerable vapours.

Vacuum extractor/oil extractor: A airtight vessel or container that is suitable for applying vacuum.

DETAILED DESCRIPTION OF THE DRAWINGS

Figure 1:
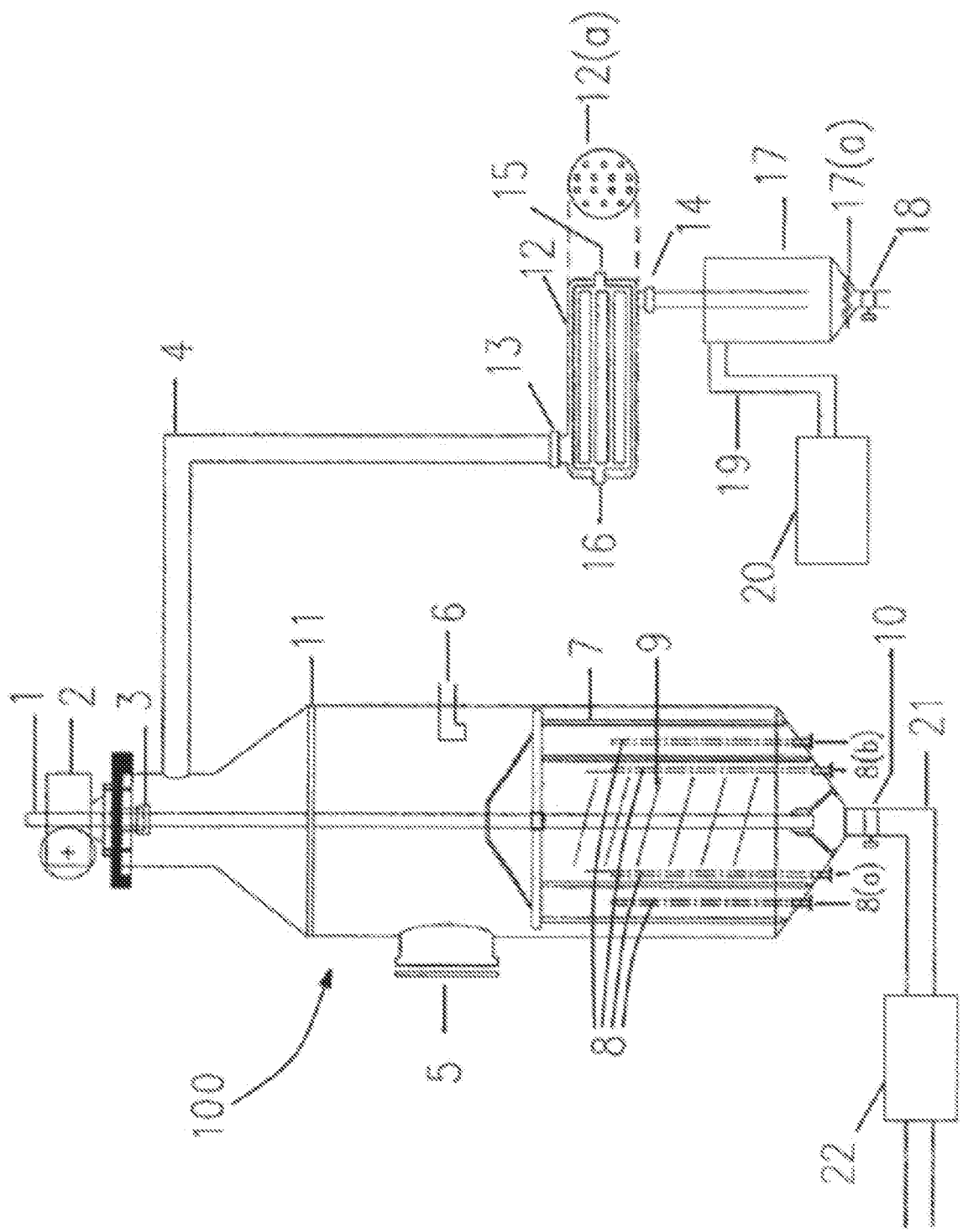
FIG. 1.: Image of an extractor according to one embodiment of this invention.

In the embodiment of FIG. 1 of this invention, the extractor is made of 4 mm AISI 18/8 304 quality stainless steel sheets. Additionally, all of its metallic parts are stainless steel of the same quality.

Here below follows a detailed description of each element in the figures according to one embodiment of this invention. Not only the dimensions but also the values or materials form part of this embodiment of the current invention, but these are non-limiting factors and are only mentioned as possible embodiment of the invention.

FIG. 1.: demonstrates a schematic drawing of a part of a batch processing plant for oil, containing a vacuum extractor (100). The vacuum extractor (100) comprises a shaft (1), that supports the scraper arms and has the auger attached thereto. The scrapers push the paste downwards because of their inclination with respect to their axis and the auger pushes the paste upwards. A gearmotor (2) in oil bath, commands the main shaft. The gearmotor (2) rotates the stirrer with a speed variator (in this embodiment variating between 20 and 60 rpm).

The shaft is enclosed in a shaft seal (3) that prevents vacuum loss. A vacuum pump connection (4) is located on the top sector to prevent paste from entering the vacuum system. As it was mentioned before, there is a significant amount of air incorporated into the freshly ground paste. When this paste comes in contact with the vacuum, water evaporation and air release will make the paste increase in size, forming bubbles which burst when they elevate. Furthermore, as explained above, not only air and water vapor is removed by the vacuum applied, water in the form of droplets is also entrained in the vapor and gas stream from the paste in the vacuum extractor. The vacuum extractor (100) further comprises a cleaning or repair door (5), that due to its size allows an operator to enter and its cover has a seal for airtightness when adjusted to prevent vacuum loss. The pre-treated (not shown in FIG. 1) oily pulp or paste is led into the vacuum extractor (100) through product inlet (6). In this embodiment the product inlet (6) is 76.2 mm (3 inches) in diameter with a valve and spout directed towards the lower part of the extractor, but this size could be different for different embodiments with an extractor with a different capacity. The product input is done by vacuum suction. The vacuum extractor (100) further comprises scraping blades (7), that have the function of scraping the ring-shaped temperature regulating liners, preventing adherences and pushing the paste towards the base of the vessel. Liners or temperature regulating lungs or temperature regulating controller means (8) control the temperature within the vacuum extractor (100). Due to the paste exposure to vacuum the temperature of the oily fruit paste will decrease, and such a temperature regulation (in this case the lungs (8)) is needed to keep the temperature constant at the preferred level. The lungs (8) enable hot water to circulate in case the paste needs to be heated, or cold water in case the paste needs to be cooled. The temperature control elements (8) of this embodiment are cylindrical, double walled, and the water comes from the bottom (8*a*), circulates upwards and after running through internal tubes, it comes out at the lower part (8*b*). The ideal temperatures within the vacuum extractor of the current invention varies between 0° C. and 35° C., preferably between 15° C. and 30° C., more preferably between 18° C. and 27° C., even more preferably between 20° C. and 27° C., most preferably between 22° C. and 26° C. The liners (8) of the current embodiment may be replaced in other embodiments by other types of heat exchangers which can keep the paste at the preferred temperatures or may also be avoided by pre-heating or pre-cooling the paste or pulp before entering the extractor.

The heat exchange surface in both liners is approximately 5 m2 in this embodiment.

The vacuum extractor (100) also comprises an auger (9), that is connected to the shaft (1). The auger (9) function is to elevate the paste deposited on the bottom of the extractor to recirculate it and put it in continuous contact with the surface where the deepest vacuum conditions exist. A product outlet valve (10) is placed at the bottom of the vacuum extractor (100). The paste goes through this product outlet valve (10) towards a pump which sends it to the separating device, such as decanter, regulating the flow according to its capacity. In this embodiment, its size is 127 mm (5 inches) but this size may be different for an extractor with a different capacity. A steam jet (11) is placed within the vacuum extractor (100) above the surface of the oily paste. Its function is to move the paste during the extractor draining to avoid its contact with the air to prevent the paste from oxidizing and adhering to the walls of said extractor. In other embodiments, an inert gas or other suitable means may be used.

A tubular condenser (12) is connected through vacuum connection inlet (13) to the vacuum pump connection (4) and the vacuum extractor (100). Vapours mixed with olive flavours are condensed when going through the refrigerated condenser. The tubular condenser (12) is used to recover flavours escaping the paste during the oily pulps exposure to vacuum. The flavours, either volatile or part of entrained fluid droplets are condensed by cooling down in the tubular condenser (12) and are thereafter collected in sealed condensate collection vessel (17) together with the condensed water before being returned into the oily pulp in the vacuum extractor (100). A cross-section of the tubular condenser (12) is shown in (12a), demonstrating the cooling tubes of the tubular condenser (12). The tubular condenser (12) has a cooling liquid inlet (15) and a cooling liquid outlet (16). In this embodiment the cooling liquid recirculates at 4° C. by going through a refrigerator. The condensate collection vessel (17) collects the condensed fluid and flavours. The condensate collection vessel (17) of this embodiment furthermore has a cooling liquid circulation coil (17a) (or any other exchange system) wherein cooling liquid at 4° C. also circulates to keep condensed liquids at a low temperature and prevent them from volatilizing due to the vacuum pump gas release. The condensate collection vessel (17) further comprises a condensed flavour discharge tubing (18) that is introduced into the vessel (17) as a level trap since the vacuum enters at a height greater than its discharge. A vacuum pump, with the necessary vacuum capability or flow for the extractor size to be built (20) is connected to the condensate collection vessel (17) through vacuum intake (19). The vacuum extractor (100) has a paste or pulp outlet tubing (21) with product outlet valve (10) connecting the vacuum extractor (100) with a suitable separating device, such as decanter (not shown). Once the oil has been extracted from the paste, the valve (10) opens to feed the screw pump (22) that doses the proper flow for the type of separation such as decanter used.

In one embodiment of this invention, the extractor is 3300 mm in height and 1100 mm in diameter. The external water liner is 1000 mm in height and 1100 mm in internal height, with a tubular cylindrical extension of the internal face of 100 mm made of 4-mm thick stainless steel.

The equipment has control and safety devices: sight glass with steamers (for internal cleaning), thermometer, vacuum meter and a water inlet valve.

There may be extractors designed with different formats and dimensions since the principle is to put the paste surface in contact with the vacuum, so a continuous extractor such as the embodiment disclosed FIG. 6. and described in detail below, can be designed as long as it respects the physical principles of the present invention.

There follows a detailed description of the function of the vacuum extractor of the embodiment of the present invention according to FIG. 1.

The oily fruit paste enters the extractor (100) through the product inlet (6) sucked by the vacuum from the mixing vessel. The paste enters with the scrapping blades (7) rotating at suitable speed, in this embodiment between 40 and 60 rpm depending to the variety, the ripeness degree, and the humidity of the oily fruit to be processed. The movement of the scraping blades (7) is generated by the gearmotor (2) and transmitted by the shaft (1). Within the part of the oily paste under vacuum at any given point, that is the paste at or close to the surface, vacuum will cause the evaporation of water from the oily paste. This water extraction is assumed to cause intracellular destruction within the oily fruit tissue. Also, with the vacuum applied through the vacuum pump (20), the emulsions are assumed to be broken and the oil extracted intracellularly from the vacuoles (intracellular receptacles surrounded by a plasma membrane containing oil in olives), water and gases. However, the extraordinary high amount of oil released by the present invention at such a low temperature is extremely surprising and the exact physical and chemical phenomena's underlying the exceptional increase in oil release can only be speculated on.

The paste recirculates due to the movement generated by the scraping blades (7) and auger (9) and the effect of the vacuum can be observed through the extractor display (not shown) as a bubbling in the surface of the oily paste. The paste recirculation is done by means of the auger (9) and the scraping blades (7). The action of the scraping blades (7) makes the paste descend to the bottom of the extractor, wherein the auger (9) will take it and send it upwards again, therefore achieving continuous recirculation. The purpose of recirculation is for the paste to move to the surface to come into contact with the vacuum provided to achieve the water extraction. Also during said recirculation the paste comes into contact with the temperature regulation liners or lungs (8), which exchange heat with the paste in order to keep it at a temperature between 0° C. and 35° C., preferably between 15° C. and 30° C., more preferably between 18° C. and 27° C., even more preferably between 20° C. and 27° C., most preferably between 22° C. and 26° C., or any other desired temperature during the extraction. The gases extracted from the paste through the action of the vacuum circulate through the vacuum pump connection (4) towards the tubular condenser (12), wherein the flavours in the condensate collection vessel (17) are condensed. The end of the extraction is evidenced when the paste stops bubbling. This can be observed through the sight glass provided in the extractor (not shown). The time needed to finalize the process of the current embodiment is approximately 40 minutes. However, the time needed will depend on several factors, such as paste fluidity in the extractor, state of oily fruit ripeness, type of oily fruit and oily fruit variety, temperature applied, paste surface area, amount of movement within the paste etc.) and the design of the vacuum extractor. With larger paste area exposed to vacuum, the malaxing time needed will shorten accordingly. Once the process is finalized, the mixing speed is reduced, in the current embodiment to 20 rpm, to avoid producing emulsions when pulling the vacuum. As the current embodiment is a batch process, the next step is to turn off the vacuum pump (20) and activate the steam jet (11) to avoid air entering when breaking the vacuum and draining the extractor. The extractor draining is done by the product outlet valve (10) and the paste outlet tubing (21). The pump (22) will send the paste towards the separating step or device, in this embodiment a decanter, and with this pump (22) the paste flow will be regulated so it is appropriate for said separating device or decanter. Before this and after stopping the vacuum, the condensate from condenser (12) is added to the paste.

The auger (9) is inside a cylinder with a height greater than the temperature regulating liners or lungs (8). This facilitates a greater filling level of the extractor.

With the vacuum action of the current embodiment, that is a vertical design of a vacuum extractor (100), different mixing speed is possible. The preferred speed for a vertical vacuum extractor (100) is between 40 rpm-80 rpm, such as between 50 rpm-70 rpm, or more preferred between 55 rpm-65 rpm or even more preferred at around 60 rpm.

Regarding the flavour recovery, there are several very well-developed methods, and any one of them can be used in this invention.

Figure 2:
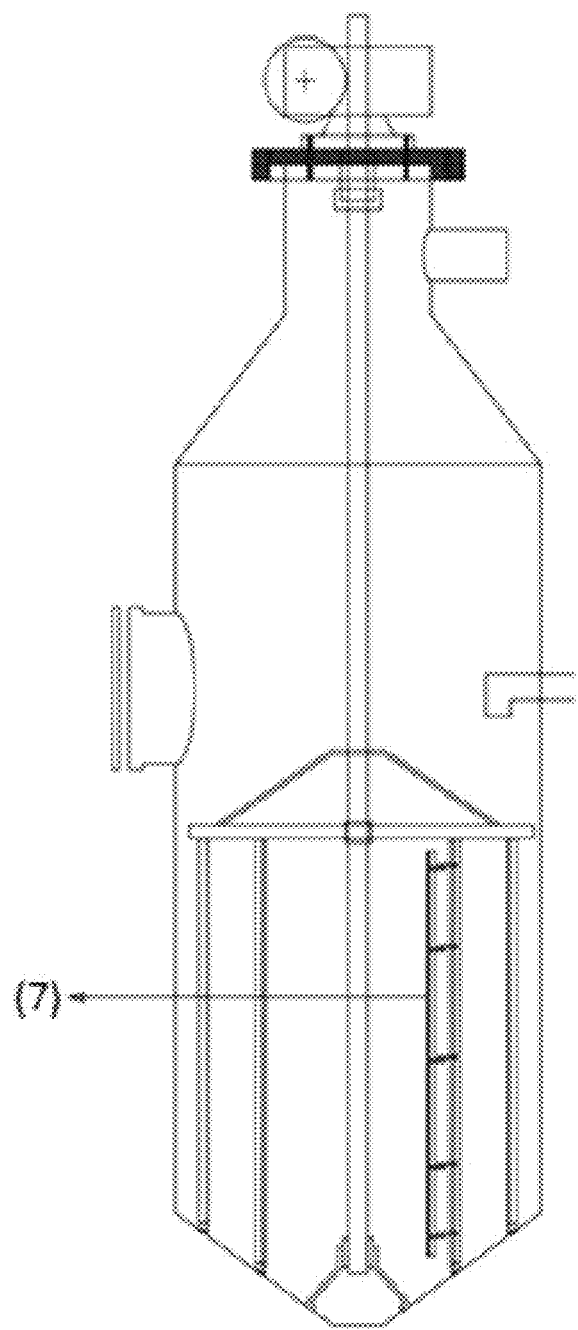
FIG. 2.: Image of an extractor according to one embodiment of this invention detailing the scraping blades.

FIG. 2. A closer-up view of the vacuum extractor demonstrated in FIG. 1, showing the details of the scraping blades (7).

Figure 3:
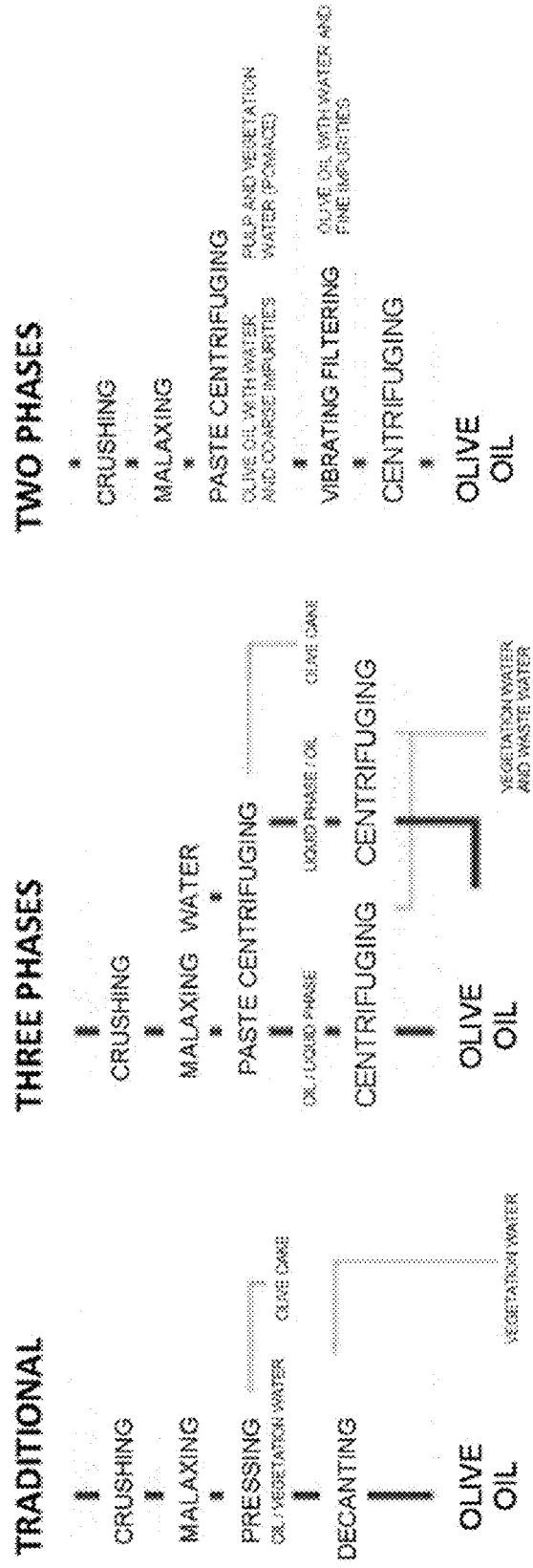
FIG. 3.: Diagram of the stages of an olive oil extraction method according to the prior art.

FIG. 3. shows a diagram of the stages of an olive oil extraction method according to the prior art.

Figure 4:
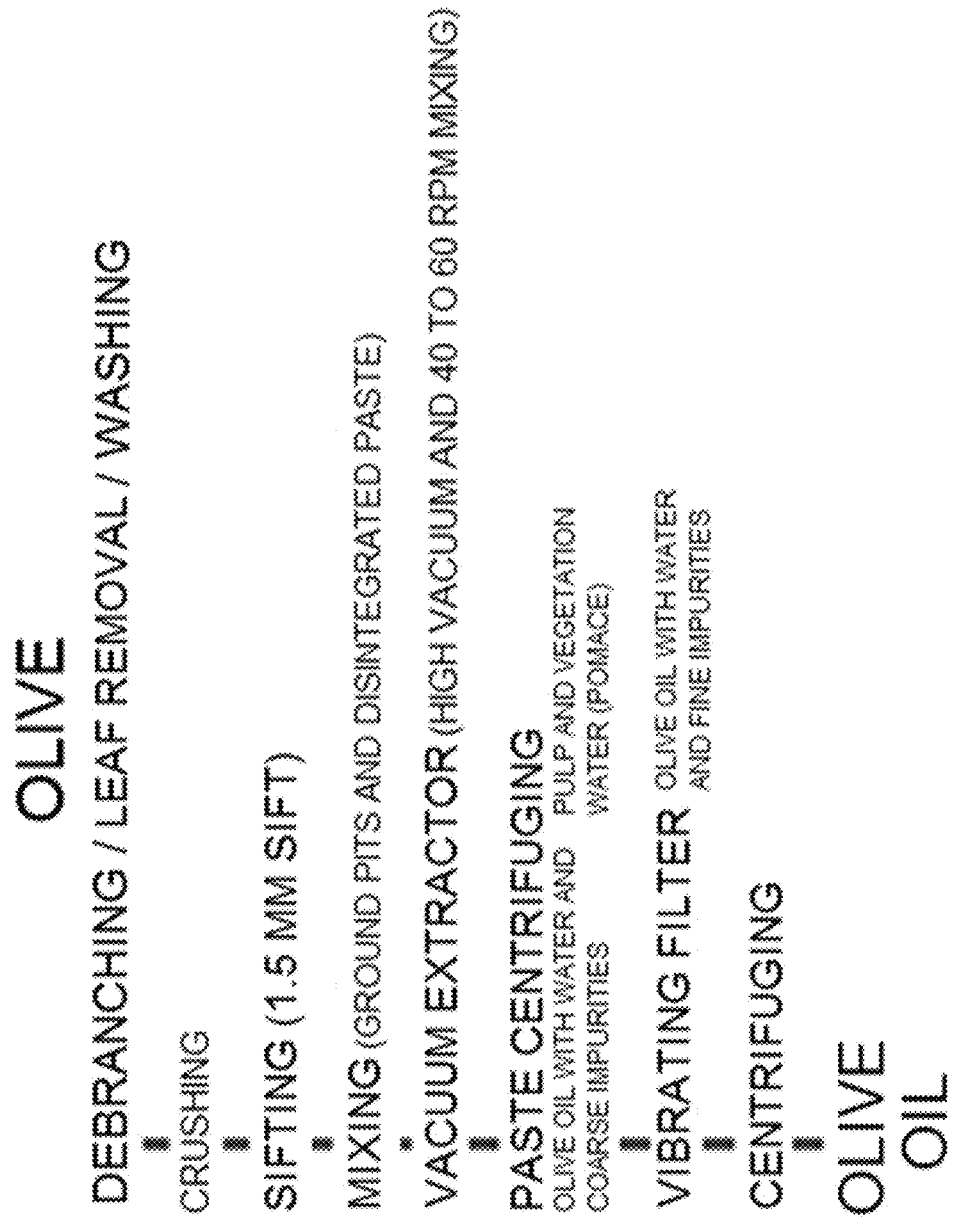
FIG. 4.: Diagram of the stages of an olive oil extraction method according to one of the embodiments of this invention.

FIG. 4. discloses a diagram of the stages of an olive oil extraction method according to one of the embodiments of this invention.

Figure 5:
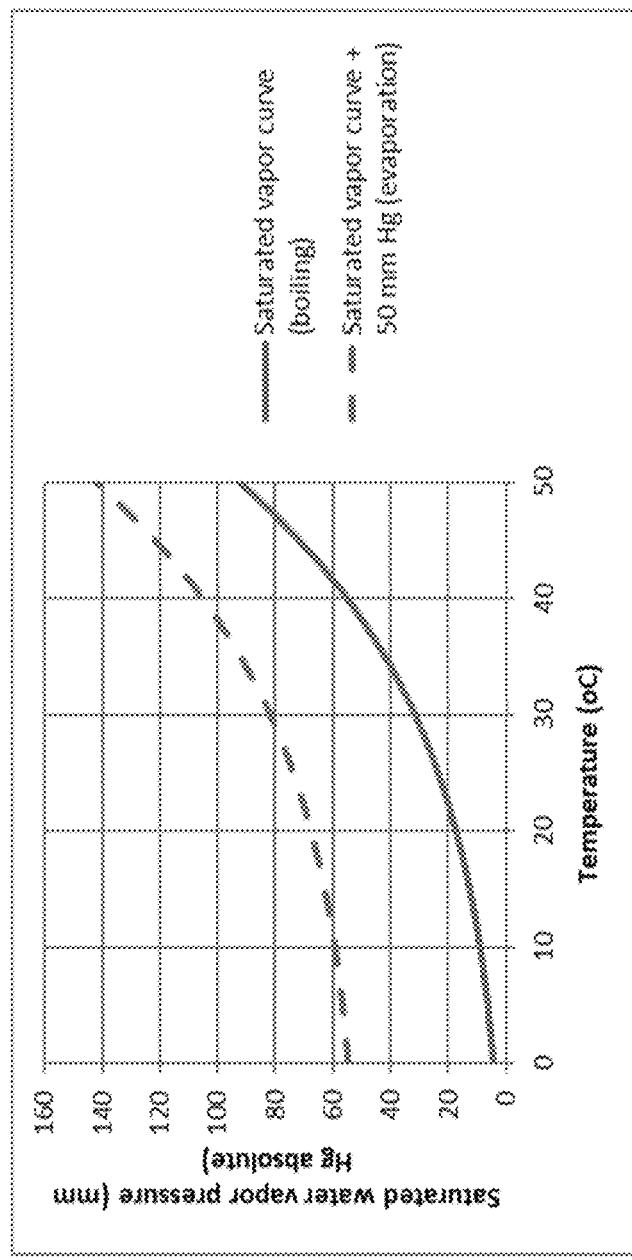
FIG. 5. A diagram demonstrating the effects of the relationship of vacuum (pressure) and temperature on the boiling point of water FIG. 6.: A schematic drawing of one embodiment of the invention, disclosing a possible continuous setup

FIG. 5. demonstrates the relationship between water evaporation, temperature and pressure.

The method of the current invention, utilizes a vacuum for partly evaporating water from an oily fruit paste by lowering the system pressure at the paste surface to or close to the saturated water vapor pressure at a given temperature. The temperature range of the invention is from 0° C., corresponding to pressure of 4.6 mm Hg absolute, to 50° C., corresponding to 92.5 mm Hg absolute. See Table 1 below.

However, as water starts to evaporate long before it reaches its boiling point, the current invention will work over wider range of vacuum and temperature. This range is demonstrated in FIG. 5, by the solid line representing the pressure where water is at its boiling temperature and pressure, and the dashed line representing the boiling pressure+50 mm Hg at a given temperature where a significant amount of evaporation would be observed. The current invention can be utilized within the whole range between the full and the dashed line of FIG. 5.

A preferred temperature interval for the vacuum extraction of the present invention is from 0° C. (where the water will boil at a pressure of 4.6 mm Hg absolute and significant water evaporation starts at a pressure of around 54.6 mm Hg absolute) or (10° C. (where the water will boil at a pressure of 9.2 mm Hg absolute and significant water evaporation starts at a pressure of around 59.2 mm Hg absolute) to 45° C. (where water will boil at pressure of 71.9 mm Hg absolute and significant water evaporation will starts at around pressure of 121.9 mm Hg absolute). Depending on the type and thereby the nature of the oily fruit there will be a more preferred temperature range. For an olive oil paste the preferred range would be in the range of 0° C. (where water boils at pressure of 4.6 mm Hg absolute and significant water evaporation will starts at around pressure of 54.6 mm Hg absolute) and 35° C. (where water will boil at a pressure of 42.2 mm Hg absolute), preferably between 15° C. (where water will boil at a pressure of 12.8 mm Hg) and 30° C. (where water will boil at a pressure of 31.8 mm Hg absolute and significant water evaporation will starts at around pressure of 81.8 mm Hg absolute), more preferably between 18° C. (where water will boil at a pressure of 15.5 mm Hg absolute and significant water evaporation will starts at around pressure of 65 mm Hg absolute) and 27° C. (where water will boil at a pressure of 26.7 mm Hg absolute and significant water evaporation will starts at around pressure of 76.7 mm Hg absolute), even more preferably between 20° C. (where water will boil at a pressure of 17 mm Hg absolute and significant water evaporation will starts at around pressure of 67.5 mm Hg absolute) and 27° C. where water will boil at a pressure of 26.7 mm Hg absolute and significant water evaporation will starts at around pressure of 76.7 mm Hg absolute) and most preferably between 22° C. (where water will boil at a pressure of 19.8 mm Hg and significant water evaporation will starts at around pressure of 69.8 mm Hg absolute) and 26° C. (where water will boil at a pressure of 25.2 mm Hg and significant water evaporation will start at around pressure of 75.2 mm Hg absolute). The preferred temperature and pressure range for other oily fruits will depend on the oily fruit and the temperature that the oil will tolerate during processing. See Table 1 below that demonstrates the relationship between water evaporation pressure and temperature.

TABLE 1 the relationship between water evaporation, temperature and pressure.

| Temp (° C.) | Pressure (mm Hg) | |
|---|---|---|
| | Saturated water (boiling) | Saturated water + 50 mmHg (evaporation of water) |
| 0 | 4.6 | 54.6 |
| 1 | 4.9 | 54.9 |
| 2 | 5.3 | 55.3 |
| 3 | 5.7 | 55.7 |
| 4 | 6.1 | 56.1 |
| 5 | 6.5 | 56.5 |
| 6 | 7 | 57 |
| 7 | 7.5 | 57.5 |
| 8 | 8 | 58 |
| 9 | 8.6 | 58.6 |
| 10 | 9.2 | 59.2 |
| 11 | 9.8 | 59.8 |
| 12 | 10.5 | 60.5 |
| 13 | 11.2 | 61.2 |
| 14 | 12 | 62 |
| 15 | 12.8 | 62.8 |
| 16 | 13.6 | 63.6 |
| 17 | 14.5 | 64.5 |
| 18 | 15.5 | 65.5 |
| 19 | 16.5 | 66.5 |
| 20 | 17.5 | 67.5 |
| 21 | 18.7 | 68.7 |
| 22 | 19.8 | 69.8 |
| 23 | 21.1 | 71.1 |
| 24 | 22.4 | 72.4 |
| 25 | 23.8 | 73.8 |
| 26 | 25.2 | 75.2 |

TABLE 1-continued the relationship between water evaporation,
temperature and pressure.

| Temp (° C.) | Pressure (mm Hg) | |
|---|---|---|
| | Saturated water (boiling) | Saturated water + 50 mmHg (evaporation of water) |
| 27 | 26.7 | 76.7 |
| 28 | 28.3 | 78.3 |
| 29 | 30 | 80 |
| 30 | 31.8 | 81.8 |
| 31 | 33.7 | 83.7 |
| 32 | 35.7 | 85.7 |
| 33 | 37.7 | 87.7 |
| 34 | 39.9 | 89.9 |
| 35 | 42.2 | 92.2 |
| 36 | 44.6 | 94.6 |
| 37 | 47.1 | 97.1 |
| 38 | 49.7 | 99.7 |
| 39 | 52.4 | 102.4 |
| 40 | 55.3 | 105.3 |
| 41 | 58.3 | 108.3 |
| 42 | 61.5 | 111.5 |
| 43 | 64.8 | 114.8 |
| 44 | 68.3 | 118.3 |
| 45 | 71.9 | 121.9 |
| 46 | 75.7 | 125.7 |
| 47 | 79.6 | 129.6 |
| 48 | 83.7 | 133.7 |
| 49 | 88 | 138 |
| 50 | 92.5 | 142.5 |

FIG. 6 discloses another embodiment of the current invention, where the oily fruit is processed in a continuous manner. The oily fruit paste (A) enters the first vacuum extractor (1000a) through the product inlet (106) sucked by the vacuum generated by the vacuum pump (120). Vacuum is applied to the surface (130a) of the oily paste (A) by the vacuum pump (120) through the vacuum pump connection (104). As explained above, the low pressure (or vacuum) is at the surface of the oily fruit paste (130), and therefore the oily fruit paste is recirculated through the rotation of a rotation device (109a), for ensuring that all the oily fruit paste will be subjected to vacuum and hence evaporation of water from the paste.

The first vacuum extractor (1100a) is in fluid connection with a second vacuum extractor (1100b) through the first extractor connection (124a). The extractor connection (124a) is placed below the surface (130a) of the oily fruit paste (A) of first vacuum extractor (1100a), hence allowing flow of the oily fruit paste (A) from the first vacuum extractor (1100a) to the second vacuum extractor (1100b). The second vacuum extractor (1100b) is also in fluid connection with the third vacuum extractor (1100c) through the second extraction connection (130c). In the embodiment of FIG. 6, there system demonstrated comprises three vacuum extractors, but any number of vacuum extractors can be utilized, such as two vacuum extractors, three vacuum extractors, four or more vacuum extractors, for continuous vacuum extraction according the present invention. Both the second (1100b) and the third (1100c) vacuum extractors also comprise a rotation device (109b and 109c) for recirculating the oily fruit paste (A) to the oily fruit paste surface (130b) and (130c) respectively. All three vacuum extractors (1100a; 1100b and 1100c) are in fluid connection with a vacuum pump (120) through vacuum pump connection (104). Furthermore, all three vacuum extractors of the current embodiment are in fluid connection with a product outlet (121) that together with product outlet pump (110) passes the vacuum treated and extracted oily fruit product (B) of each extractor to a separation device, such as decanter (not shown) for empty of entire system at the end of continuous processing.

Another embodiment of the current invention is a continuous system with two or more vacuum extractors (1001a; 1001b; 1001c and so on), where the vacuum extractors work parallelly by processes individually in batches. 124a and 124b are closed and there is no fluid connection between the vacuum extractors. Each vacuum extractor (1001a; 1001b; 1001c and so on) processes in batch and each vacuum extractor has a separate, or at least separately controlled paste feeding system (104a; 104b; 104c (not shown)). Paste is charged alternatively to separate vacuum extractor, and discharged separately, resulting in continuous process of individual batches in parallel, enabling a continuous system without the fluid connection between vacuum extractors.

In yet another embodiment a continuous process utilizes a recirculation pump instead of fluid connection (124) for recycling and returning the oily fruit paste from one vacuum extractor (1100a) to the next vacuum extractor (1100b) in a continuous succession and continuous processing of the oily fruit paste.

The vapours and gases extracted from the paste through the action of the vacuum circulate through the vacuum pump connection (4) towards the tubular condenser (12), wherein the water vapours, flavours and other condensables are condensed and collected in the condensate collection vessel (17). The end of the extraction is evidenced when the paste stops bubbling. This can be observed through the sight glass provided in the extractor (not shown). The time needed to finalize the process of the current embodiment is approximately 40 minutes. However, the time needed will depend on several factors, such as paste fluidity in the extractor, state of oily fruit ripeness, type of oily fruit and oily fruit variety, temperature applied, paste surface area, amount of movement within the paste.

In various embodiments of the current invention the holding time or malaxing time will be determined by the volume of paste in each vacuum extractor and the number of individual vacuum extractors utilized, together with the throughput (or process capacity of the processing line). Possible holding time (the timespan that the oily fruit paste is exposed to vacuum within the vacuum extractor) is therefore highly variable. In one embodiment of the current invention the holding time is between 20-50 min, preferably between 30-40 min, even more preferably between 35-45 min. In another embodiment the holding time can vary anywhere between 10-190 min.

A flavour condenser (112) is connected to the vacuum pump connection (104). The condenser (112) is used to recover flavours escaping the oily fruit paste with the water vapours during the oily fruit paste exposure to vacuum. The condenser (112) condenses the water vapor, flavour compounds and other condensables by cooling and the condensate led to the collection vessel (117) from where the condensate is returned to the product (B) stream in product outlet (121) before the product (B) passes through product outlet valve (110) and is passed on to separation step (not shown). In one embodiment the condensate and flavours are returned directly into each vacuum extractor (1100a, 1100b, 1100c). In one embodiment this condensate and flavours return is done by gravity, by placing the condensate collection vessels (117a, 117b, 117c (not shown)) above each vacuum extractor.

The volume of the first vacuum extractor (1100a) above the surface of the oily fruit paste (130a), is larger than the volume of the oily fruit paste within the first vacuum extractor (1100) as demonstrated by dotted lines 131a and 132a. Same principle applies for the second (1100b) and third (1100c) vacuum extractors, though not shown in FIG. 6.

In one embodiment of the current invention, the processing space or volume (131) above the oily fruit paste surface (130) has the height of between 50 cm and 150 cm, preferably between 75 cm and 125 cm, more preferably about 100 cm (for exposing a large surface 130). In another embodiment the processing space (131) above the oily fruit paste surface (130) is at least 100 cm or the size of the diameter of the vacuum extractor (1100a; 1100b; 1100c) whatever is the largest.

In one embodiment the vacuum extractors (1100a, 1100b and 1100c) have an elongated horizontal form, creating a larger area of the oily fruit surface (130), thereby increasing the amount of oily fruit paste (A) subjected to vacuum in the vacuum extractor. With the design of the vacuum extractors (1001a, 1001b, 1001c) being substantially horizontal as in the embodiment of FIG. 6., there will be considerably larger surface area (130a, 130b, 130c) of the oily fruit paste exposed to vacuum than in the vertical version of the vacuum extractor (100) of the embodiment demonstrated in FIG. 1. Therefore the horizontal design results in a substantially larger portion of the oily fruit paste being exposed to the vacuum at any given time. The larger surface area (130a, 130b, 130c) and more vacuum exposure, of the horizontal design will give rise less need of vigorous mixing within the vacuum extractor (1001a, 1001b, 1001c). In one embodiment of the current invention with a horizontal design of the vacuum extractor, the preferred mixing speed will be between 5-30 rpm, preferably between 10-25 rpm, even more preferably between 15-25 rpm, such as between 20-25 rpm, more preferably around 20 rpm.

In different embodiments of the invention, depending on the composition of the paste and the design of the vacuum extractor (100), such as the vertical design of this embodiment vacuum extractor (100) and the horizontal design of the vacuum extractor disclosed in FIG. 6. (1001a, 1001b, 1001c), the mixing speed can vary between 5-80 rpm. In a preferred embodiment utilizing a vertical design of the vacuum extractor (100) the mixing speed is between 20-80 rpm, such as between 30-60 rpm, more preferred between 30-50 rpm, such as between 35-45 rpm, preferably around 40 rpm.

In one embodiment of the current invention the airtight vessel of the vacuum extractor (100, 1100a, 1100b or 1100c) has cylindrical shape; wherein the diameter-length ratio is between 1:2 and 1:5, such as preferably between 1:2 and 1:4, even more preferably the diameter-length ratio is around 1:3, the vessel preferably being substantially horizontally elongated or horizontal.

In one embodiment wherein the oil extraction device is adapted for a continuous running mode, the average resting time of the oily fruit in the airtight vessel preferably being between 10 minutes and 60 minutes, preferably between 20 minutes and 30 minutes, such as about 25 minutes.

As demonstrated in the examples below, the oily fruit paste entering the vacuum extractor of the invention will have high levels of water content, for olive oil in the range of 50-65% weight. When the product (B) exits the vacuum extractor (100) or line of extractors (1100a; 1100b; 1100c) through product outlet (21 or 121), a major part of the water content has been evaporated during the exposure to vacuum within the vacuum extractor. In one embodiment of the present invention, the product (B) will have water content of between 10% and 40%, preferably between 20%-30%, such as about 25%.

DETAILED DESCRIPTION OF EMBODIMENTS

In one embodiment of this invention, a high quality olive oil extraction method is developed, with improved yields as compared to the methods currently in use.

In an embodiment of this invention, the clean olives are grounded using a traditional hammer crusher rotating at 2400 rpm with a sieve of approximately 5 mm. As a result of this process, an olive paste is obtained consisting of 1.5-3.5% epicarp (skin), 70-80% mesocarp (pulp), 15-28% endocarp (pit), 2-4% seed (nut) and oil-in-water emulsions.

In an additional embodiment of this invention, when exiting the mill, the ground olives goes through a sift. This sift has rotating blades working at a speed of 800 rpm and has sieves with round orifices the diameter of which may vary from 1 to 4 mm. The action of the sift causes the almost total breakage of the tissues, exposing the cells containing oil in their interior to the ensuing processes done in the extractor of this invention. Through the center of the sift, the blades push the ligneous endocarp pieces (pit) towards the end opposite to the paste input. Also, the mesocarp (containing most of the oil) is pushed by the rotating blades through the round orifices of the sift, producing the mechanical breakage of the tissues.

In one embodiment of this invention, the products obtained from the sifting process are mixed in a horizontal blade vessel to homogenize them.

In another embodiment of this invention, the mixing process of the products obtained in the sifting process is avoided by using a high yield sift, thus increasing the production capacity. A higher yield sift means a sift able to process the amount of paste necessary to feed the decanter or other suitable separation means and which extracts all the pulp from the olive. This is done with several superimposed sifts which reprocess the endocarp.

In yet another embodiment, the cellular tissue disaggregation, or homogenization, is done by using a grinder to grind the olive in smaller fractions or by using a conventional crusher.

In a further embodiment of this invention, the olive paste obtained by any of the cellular tissue disaggregation methods mentioned, or any other method allowing for olive tissue disaggregation into smaller fractions, is transferred to a vacuum extractor of this invention. The purpose of this step is to extract the oil from inside the paste by applying vacuum inside the extractor. To that end, all the paste surface is exposed to said vacuum. In an embodiment of this invention, this is done by mixing and recirculating the paste inside the extractor. The surface-to-volume ratio of the oily fruit paste can also be altered, by designs of the vacuum extractor (100; 1100a; 1100b and 1100c). Larger oily fruit paste surface will expose more of the paste to the vacuum at the surface, resulting in more effective and faster evaporation of water from the paste and correspondingly more release of oil within the paste.

In one embodiment of the present invention the airtight vessel of the vacuum extractor (100, 1100a, 1100b or 1100c) has cylindrical shape; wherein the diameter-length ratio is between 1:2 and 1:5, preferably between 1:2 and 1:4, even more preferably 1:3, the vessel preferably having a vertical orientation.

One aspect of this embodiment is based on the hypothesis or assumption that the oily fruit paste exposure to vacuum will induce a fast breakage of the emulsions generated in the crushing or depitting process, producing a great amount of free oil. One hypothesis is that this could reduce the action of lipases (hydrolysis produced in the oil-water interface breaking the triglycerides into partial glycerides and free fatty acids). Possible assumption is that this could happen without affecting the possible synergy between the esterase and the β-glucosidase or with limited effect on the possible synergy between the esterase and the β-glucosidase. Both enzymes are very important to transform phenolic molecules of fruit into aglycons and simplest phenolic compounds which are migrated to oil with increase of antioxidant and, consequently, shelf life. On the contrary, by inhibiting the action of the polyphenoloxidase and the peroxidase due to the absence of oxygen, the assumption is that a greater amount of antioxidants present in the oil is preserved, as compared to traditional systems. Consequently, this invention provides the ideal conditions to obtain an excellent quality olive oil.

The vacuum applied in the extractor of this invention is assumed to have multiple beneficial effects, that could explain the highly surprisingly high increase in oil released from the paste while simultaneously producing a superior oil quality, among them:

- It is assumed that it extracts intracellular fluids, composed by oil and vegetation water, through vacuole breakage. Because the tissue pieces are small, almost all the oil is released.
- It is also assumed that the evaporation of water will happen at intercellular level within the oily fruit tissue within the paste, resulting in a softer degreased oily fruit tissue and grossly increased release of oil.
- It works in the absence of oxygen, which prevents oxidation thus preserving the antioxidants present in the oil and considerably increases its shelf-life and nutritional benefits
- It allows processing olives with different hydration degrees without affecting yield.
- It allows processing olives with different ripeness degrees without affecting yield, regarding total fat in the olives.
- It eliminates the use of any kind of adjuvant like talc or kaolinite.

In an embodiment of this invention, a steam jet is used during the extractor when breaking the vacuum and when draining to avoid displacing the paste with air which could cause small surface oxidations in it. Additionally, the steam jet favors cleaning the extractor surface, preventing adherence of the paste to such surface.

In another embodiment of this invention, an inert gas injection is used during the extractor when breaking the vacuum and when draining to prevent oxygen from fixing to the paste when air enters as the vacuum is broken.

The total time for the paste to remain inside the extractor depends on a number of factors such as the vacuum pump capacity, the paste surface exposure to the vacuum action (recirculation speed, in some of the embodiments), and the mesocarp particle size (the smaller the particles, the less time they will remain in the vacuum). In turn, the particle size depends on the mesocarp consistency, which is determined by the olive ripeness degree and the methods used to disaggregate the cellular tissue. The end of the extraction may be determined by significant reduction or absence of bubbling in the paste. In an embodiment of this invention, determination of bubbling absence is done visually.

Cellular tissue disaggregation by sifting is a complement which increases the efficiency of the extractor. The use of other methods would cause for the paste to remain inside the extractor longer to complete the extraction.

The paste processed in the extractor of this invention presents a great amount of free oil and may be separated by a two- or three-phase decanter or by pressing. In a preferred embodiment of this invention, a two-phase decanter is used.

Then the impure olive oil is subject to the effects of a vibrating filter to eliminate the coarse impurities.

Then, water and tissue traces are eliminated by centrifuging the product from the previous step.

It is worth mentioning that, even when this step is finished, there will be impurities (both solid and liquid) in the oil which will have to be eliminated by other methods, such as gravity precipitation or filtering.

The main advantages of the olive oil extraction method of this invention are a direct consequence of the use of vacuum and the intracellular oil extraction by the suction that it causes.

In a particular embodiment of this invention, an olive oil extraction device is used. It consists in a sealed vessel with a diameter-length ratio of approximately 1:2, 1:3, or higher, as long as the cost-benefit ratio is respected. The extractor has between two and three circular exchanger liners where water circulates, or may have any other heat exchanger, not only in shape but also in quantity. In another embodiment, the extractor may lack the heat exchanger if the temperature is achieved by a method prior to entering the extractor o by room temperature. The extractor also has a vertical stirrer consisting in a central shaft with branches and vertical extensions which, in the two first spaces between the circular liners, have steel scraping blades with ends made of Teflon or other material which does not contaminate the paste or wear the liners. Said scraping blades stir the olive paste towards the base of the extractor. In the central ring circle hollow formed by the first circular liner and attached to the stirrer central shaft there is an auger which moves the paste up to recirculate it. The stirrer rotates within a speed range of approximately 40-60 rpm or greater in order to ensure that the vacuum comes in contact with all the paste surface. This paste mixing, and recirculating is done continuously until the most oil can be extracted from inside the paste. In another embodiment of this invention, the extractor has a flavour retriever refrigerated at a low temperature of approximately 4° C., and the condensed flavours are added to the paste just before draining the extractor.

In another embodiment, the paste recirculation inside the extractor can be done using any mechanical method which allows the paste to be exposed to the action of the vacuum. A non-limiting example is using a pump as an alternative or complement together with the auger.

The experiments disclosed in the current invention were conducted in Mendoza, approximately 600 m above sea level where the normal air pressure can accordingly be estimated to be around 706 mmHg.

The manometer reading during the preferred embodiment of the current experiments was minus 660-670 mm Hg gross. Accordingly, the absolute pressure during the experiments ranged from 36-46 mm Hg absolute. The preferred temperature during the experiments disclosed in this invention was around 27° C. At 27° C. water boils at 26.7 mm Hg absolute and significant water evaporation will take place in the pressure interval from 26.7 mm Hg to 76.7 mm Hg absolute.

In a yet another embodiment of this invention the vacuum applied in a 1200 kg load extractor is minus 650-660 mmHg gross for 25-45 minutes.

In different embodiments of the current invention, an optimal combination of oil yield and oil quality will depend on the temperature applied, the vacuum applied, and the time spent during the malaxing/vacuum extracting step. A person skilled in the art will know that those variables can be altered for optimal result as disclosed in publications such as Di Giovacchino, L. "Olive Oil Extraction by Pressing, Centrifugation and Percolation: Effect of Extraction Methods on Oil Yields", Olivae, vol. 36, p 14-30 (1991)

In a preferred embodiment of the invention the malaxing time is between 10-90 min, preferably between 10-60 min, more preferably between 10-45 min, such as preferably between 20-40 min, more preferred between 25-35 min and even more preferred around 30 min. The temperature applied in different embodiments of the current invention will vary from 22-35° C., preferably between 24-27° C., more preferably between 25-26° C.

As demonstrated in Table 1., above the absolute pressure applied will be a function of the temperature applied. The vacuum applied will range between 1 mm Hg absolute and 150 mm Hg absolute. In one embodiment of the invention, with the temperature applied at 22° C. the pressure applied will between 19.8-69.8 mm Hg absolute. In another embodiment of the invention with the temperature applied at 24° C. the pressure applied will between 22.4-72.4 mm Hg absolute. In yet another embodiment of the invention with the temperature applied at 25° C. the pressure applied will between 23.8-73.8 mm Hg absolute. In another embodiment of the invention with the temperature applied at 26° C. the pressure applied will between 25.2-75.2 mm Hg absolute. In yet another embodiment of the invention with the temperature applied at 27° C. the pressure applied will between 26.7-76.7 mm Hg absolute. In another embodiment of the invention with the temperature applied at 30° C. the pressure applied will between 31.8-81.8 mm Hg absolute and in yet another embodiment of the invention with the temperature applied at 35° C. the pressure applied will between 42.2-92.2 mm Hg absolute.

In one embodiment of the present invention the oily fruit paste is exposed to vacuum extraction and thereafter the solid part of the paste is separated from the liquid, with suitable separation methods (such as centrifugation in a decanter). Thereafter the solid are again exposed to a vacuum according to the invention, for a second milling or second malaxing, where after the solids and liquids are separated again.

Even though the experiments have been performed using olives and extracting olive oil, in other embodiments of this invention, the method and vacuum extractor developed are used to extract oil from other oily fruits, such as avocado or palm fruit.

EXAMPLES

The following examples, real and theoretical, are provided to illustrate the embodiments or the characteristics of this invention, but do not limit its scope.

Experiments were conducted at a pilot plant with a replica of the oil production plant at a lesser scale. In said experiments, the method of one of the embodiments of this invention was replicated. Results showed olive oil extraction yields approximately 30% to 40% greater when compared to methods used in the prior art. There were also considerable improvements in its quality. Particularly, increments in the polyphenol percentages, decreased acidity, and preservation of the antioxidant percentage were observed, among others. To verify this, a series of samples obtained in said experiments were analyzed by prestigious laboratories in Italy and Argentina, including control samples obtained by the traditional method. In these tests, it was verified that the olive oil obtained using the method of the present invention shows an increase of approximately 50% in total polyphenols without deterioration to the other parameters.

According to this invention, the vacuum extractor used for the experiments conducted at the pilot plant has the capacity to process 90-100 kg of olive paste. This vacuum extractor has a torispheric heat exchanger, with a vertical stirrer and a tube with an auger in the central shaft.

Different mixing speeds were tested by attaching a speed variator, and the best results were obtained at 60 rpm (results not shown but see above for disclosure about variation of mixing speed, depending on the oily fruit and vacuum extractor design). The paste is processed in the vacuum extractor of this invention for 40 minutes at a temperature of 27° C. With this time, temperature and mixing speed combination, the best olive oil quality-extraction yield ratio was obtained (see above for disclosure about variations in malaxing time and variation on vacuum and temperature applied during the malaxing step There follows detailed results of the experiments conducted with the following types of olives: Changlot, Arbequina, Coratina, Arauco, and Arbosana. In all the experiments, control extractions were made using methods of the prior art (FIG. 3) (Method 2, without sieves, with classic malaxing), and extractions with the method according to this invention (Method 1). In general, green olives were used.

In the laboratory, total fat percentage analyses by the Autelec method as well as humidity percent analyses were conducted.

The extraction yield is calculated as the ratio between the oil weight obtained by the extraction method and the weight of the olives used, multiplied by one hundred.

The machines used to conduct these examples are the following:
- a two-phase decanter, with a hammer crusher and a malaxer incorporated.
- an extractor with a 90 kg working capacity. Drainage was done moving air with a steam jet.

The method used to obtain the samples comprises the following stages:
- crushing: Whole olives were milled using the hammer crusher until there was a paste.
- Sifting: The milled paste was sifted with a cylindrical sift. The sift has sieves with a 1-mm opening and rotating blades (800 rpm) which separate the paste from the pit pieces.
- Mixing: The (finely milled) paste is mixed with the pits.
- Extraction: The mixture is introduced into the extractor by vacuum. A controlled temperature is kept according to the needs of each olive test/sample. The sample is stirred while applying vacuum for 40 minutes.
- Separation: The quantity of paste processed by the extractor was exactly weighed. It was sequentially processed with a two-phase decanter to avoid oxidation. The oil obtained was weighed to calculate yield.

The method used to obtain the control samples comprises the conditions indicated by the pre-established technique, adjusting working temperature, malaxing times, and processing the same kg of paste so both techniques are perfectly comparable. Regarding the raw material, homogenized batches were taken from the same series, the same origin and harvest date. The harvest season in Argentina ranges from March (month) to June (month).

Specific Details of the Experiments:

Changlot: The experiments were conducted at the end of March 2017 using green olives.

Arauco: The experiments were conducted by mid-April 2017 using very green olives. It is worth mentioning that the Arauco variety shows difficulties for oil extraction and low yields. It is a variety for which the classical methods advise adding additives (talc, kaolin or enzymes). In this experiment, for the control extractions (Method 2), 3% talc was added, and for the extractions by the method of this invention (Method 1) nothing was added.

Arbequina: The experiments were conducted on the first days of May 2017 using green olives.

Coratina: The experiments were conducted during the first two weeks of May 2017 using veraison olives.

Arbosana: The experiments were conducted during the first two weeks of June 2017 using advanced veraison olives.

The following results were obtained:

TABLE 2

| Type of olive | Changlot | Arauco | Arbequina | Coratina | Arbosana |
|---|---|---|---|---|---|
| Raw material | Green olive | Very green olive | Very green olive | Verasion | Verasion olive |
| Numer of replications with each method | 7 | 6 | 8 | 5 | 4 |
| Raw material total fat (%) | 21.5 | 14.6 | 19.9 | 24.1 | 23.3 |
| Raw material humidity (%) | 52 | 63 | 63 | 53 | 53 |
| Average yield method 1 (%) | 18.34 | 10.28 | 14.14 | 22.6 | 20.84 |
| Average yield method 2 (%) | 14.27 | 6.88 | 10.17 | 17.65 | 16.4 |
| Yield increase method 1 versus method 2 (%) | 28.5 | 49.4 | 39 | 28 | 27 |

As clearly demonstrated by the results in Table 2, the method of the current invention (method 1) gives significantly improve yields, the increase in yield varying from 27-49.4%. And as olive oil as an end-product is expensive every minor increase in yield is of major importance.

Oil samples from the Coratina variety were sent to a laboratory analysis to corroborate the results obtained. The samples sent included olive oil produced using the prior art method, which was called 1716872, and olive oil produced using the method of this invention, called 1716871.

The Following Results were Obtained:

TABLE 3

| Sample | Olive Oil no. 1716871 | Olive Oil No. 176871 |
|---|---|---|
| Total polyphenols (tyrosol) | 765 mg/kg | 512 mg/kg |
| Hydroxy-tyrosol | 3 mg/kg | 3 mg/kg |
| Tyrosol | 4 mg/kg | 3 mg/kg |
| Decarboxymethylated dialdehyde form of oleuropein aglycone (3,4 DHPEA-EDA) | 205 mg/kg | 90 mg/kg |
| Decarboxymethylated dialdehyde form of ligstroside aglycone (p. HPEA-EDA) | 113 mg/kg | 109 mg/kg |
| Lignane | 69 mg/kg | 66 mg/kg |
| Oleuropein aglycone (3,4 DHPEA-EA) | 143 mg/kg | 93 mg/kg |
| Ligstroside aglycone (p. HPEA-EA) | 43 mg/kg | 32 mg/kg |

The results obtained by the laboratory analysis allow to demonstrate that the vacuum applied in the method of this invention is able to extract highest quantity (33% in the test) of polyphenols with a consequent highest resistance to oxidation of the obtained oil. In Table 3 we appreciate also an increase of aglycones in the oil obtained by vacuum indicating that glycosidase activity is probably boosted or not inhibited. At the same time, we can hypothesize an inhibition of the oxidative enzymes polyphenoloxidase and peroxidase thanks to the reduction of oxygen from the olive paste.

The invention is not limited to the embodiments described above and shown on the drawings but can be supplemented and modified in any manner within the scope of the invention as defined by the enclosed claims.

The invention claimed is:

1. A method of extracting oil from olives, the method comprising:
   producing a paste from the olives, the producing of the paste comprising grinding the olives;
   introducing the paste into a vacuum extractor;
   exposing the paste to a vacuum in the vacuum extractor to release oil, water vapor and flavours from the paste, the vacuum to which the paste is exposed in the vacuum extractor being an absolute pressure between 1 mm Hg and 95 mm Hg;
   the exposing of the paste to the vacuum in the vacuum extractor including exposing the paste to the vacuum while maintaining the paste at a temperature between 0° C. and 35° C. throughout the exposure of the paste to the vacuum; and
   subjecting the paste which has been exposed to the vacuum in the vacuum extractor to separation to separate a solid phase from a liquid phase, the liquid phase being used to produce olive oil.

2. The method of extracting oil from olives according to claim 1, further comprising collecting flavours escaping from the paste during the exposure of the paste to the vacuum, condensing the flavours which have been collected to produce condensed flavours, and returning the condensed flavours to the paste.

3. The method of extracting oil from olives according to claim 2, wherein the returning of the condensed flavours to the paste includes returning the condensed flavours to the paste in the vacuum extractor.

4. The method of extracting oil from olives according to claim 1, wherein the subjecting of the paste which has been exposed to the vacuum in the vacuum extractor to separation includes subjecting the paste which has been exposed to the vacuum in the vacuum to separation in a horizontal centrifuge.

5. The method of extracting oil from olives according to claim 1, wherein the pressure and the temperature to which the paste is exposed in the vacuum extractor causes the paste to boil, simmer, or be kept within 50 mmHg of the saturated vapour pressure of water in the paste.

6. A method of extracting oil from oily fruit, the method comprising:
   providing the oily fruit as a paste, and
   exposing the paste to a vacuum to cause the paste to release oil, water vapor and flavours, wherein the vacuum to which the paste is exposed defines an absolute pressure of between 1 mm Hg and 95 mm Hg, and, wherein the paste that is exposed to the vacuum is maintained at a temperature between 0° C. and 35° C. throughout the exposure of the paste to the vacuum.

7. The method of extracting oil from oily fruit according to claim 6, wherein the pressure and the temperature to which the paste is exposed causes the paste to boil, simmer, or be kept within 50 mmHg of the saturated vapor pressure of water in the paste.

8. The method of extracting oil from oily fruit according to claim 6, further comprising separating the oil from the paste after the exposing of the paste to the vacuum.

9. The method of extracting oil from oily fruit according to claim 8, wherein the separating of the oil from the paste comprises using a centrifugal decanter.

10. The method of extracting oil from oily fruit according to claim 6, wherein an average holding time of the paste in the vacuum is between 10 minutes and 60 minutes.

11. The method of extracting oil from oily fruit according to claim 6, further comprising condensing the water vapor, the flavours and/or other condensables escaping from the paste as a result of the exposing of the paste to the vacuum.

12. An oil extractor for extracting oil from oily fruit by causing the oily fruit to release oil, water vapor and flavours, the oil extractor comprising:
- an airtight vessel for receiving the oily fruit in a form of a paste,
- a pressure regulating device in communication with the airtight vessel to expose the paste inside the airtight vessel to an absolute pressure of between 1 mmHg and 95 mmHg, and
- a temperature regulating device in communication with the airtight vessel to maintain the paste inside the airtight vessel at a temperature of between 0° C. and 35° C.

13. The oil extractor according to claim 12, wherein the pressure regulating device and the temperature regulating device are configured to subject the paste inside the airtight vessel to boiling or simmering or to maintain the paste inside the airtight vessel within 50 mmHg of the saturated vapor pressure of the paste.

14. The oil extractor according to claim 12, wherein the airtight vessel defines a disengagement height at least equal to a diameter of the airtight vessel or 1 m, whichever is largest.

15. The oil extractor according to claim 12, further comprising at least one orifice above a filling level of the airtight vessel to communicate with the pressure regulating device.

16. The oil extractor according to claim 12, wherein the oil extractor is configured to operate in a continuous running mode, an average holding time of the paste in the airtight vessel being between 10 minutes and 60 minutes.

17. The oil extractor according to claim 12, wherein the oily fruit is olive, avocado or palm fruit.

18. A system for extracting and separating oil from oily fruit, the system including an oil extractor according to claim 12 and a separator, the separator being configured to receive the paste from the oil extractor and separate the oil from the paste.

19. The system according to claim 18, wherein the separator is a decanter centrifuge or a hydraulic press system.

\* \* \* \* \*